(12) United States Patent
Kim

(10) Patent No.: US 10,234,567 B2
(45) Date of Patent: Mar. 19, 2019

(54) LOCATION AWARENESS APPARATUS, VEHICLE HAVING THE SAME AND METHOD FOR CONTROLLING THE APPARATUS

(71) Applicant: Hyundai Motor Company, Seoul (KR)

(72) Inventor: Yun Young Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 343 days.

(21) Appl. No.: 15/179,186

(22) Filed: Jun. 10, 2016

(65) Prior Publication Data
US 2017/0242132 A1    Aug. 24, 2017

(30) Foreign Application Priority Data
Feb. 19, 2016  (KR) .................. 10-2016-0019461

(51) Int. Cl.
| G01S 19/45 | (2010.01) |
|---|---|
| G01S 17/02 | (2006.01) |
| G01S 19/13 | (2010.01) |
| G01S 19/41 | (2010.01) |

(52) U.S. Cl.
CPC ............ *G01S 19/45* (2013.01); *G01S 17/023* (2013.01); *G01S 19/13* (2013.01); *G01S 19/41* (2013.01)

(58) Field of Classification Search
CPC .......... G01S 19/45; G01S 19/13; G01S 19/41; G01S 19/07; G01S 19/43; G01S 19/15; G01S 17/023; G01S 5/009
USPC .................................................... 342/357.24
See application file for complete search history.

(56) References Cited

U.S. PATENT DOCUMENTS

| 2004/0230373 | A1* | 11/2004 | Tzamaloukas | G01C 21/28 |
|---|---|---|---|---|
| | | | | 701/468 |
| 2012/0209519 | A1* | 8/2012 | Basnayake | G01C 21/32 |
| | | | | 701/457 |
| 2014/0210644 | A1* | 7/2014 | Breed | G01S 17/936 |
| | | | | 340/905 |
| 2015/0149083 | A1* | 5/2015 | Lee | G01C 21/26 |
| | | | | 701/468 |

(Continued)

FOREIGN PATENT DOCUMENTS

| JP | H07244148 A | 9/1995 |
|---|---|---|
| JP | H09113600 A | 5/1997 |
| JP | 2006-275695 A | 10/2006 |

(Continued)

OTHER PUBLICATIONS

Notice of Allowance for Korean Patent Application No. 10-2016-0019461, dated Jun. 21, 2017, English Abstract.

*Primary Examiner* — Harry K Liu
(74) *Attorney, Agent, or Firm* — Mintz Levin Cohn Ferris Glovsky and Popeo, P.C.; Peter F. Corless

(57) ABSTRACT

A location awareness apparatus includes: a communication unit performing communications with a plurality of satellites and with another device; and a controller recognizing a current location of the device based on information received from the plurality of satellites, controlling communications with the other device when a number of satellites available for communication is less than a reference number during the recognition of the current location, receiving satellite information from the other device, and correcting the current location based on the information received from the plurality of satellites and the satellite information received from the other device.

22 Claims, 13 Drawing Sheets

(56) References Cited

U.S. PATENT DOCUMENTS

2016/0205656 A1* 7/2016 Zeng .................... H04W 4/046
                                                    455/456.1

FOREIGN PATENT DOCUMENTS

| JP | 2009145167 A | 7/2009 |
|---|---|---|
| KR | 2009-0122543 A | 12/2009 |
| KR | 10-2010-0028189 A | 3/2010 |
| KR | 101231534 B1 | 2/2013 |

* cited by examiner

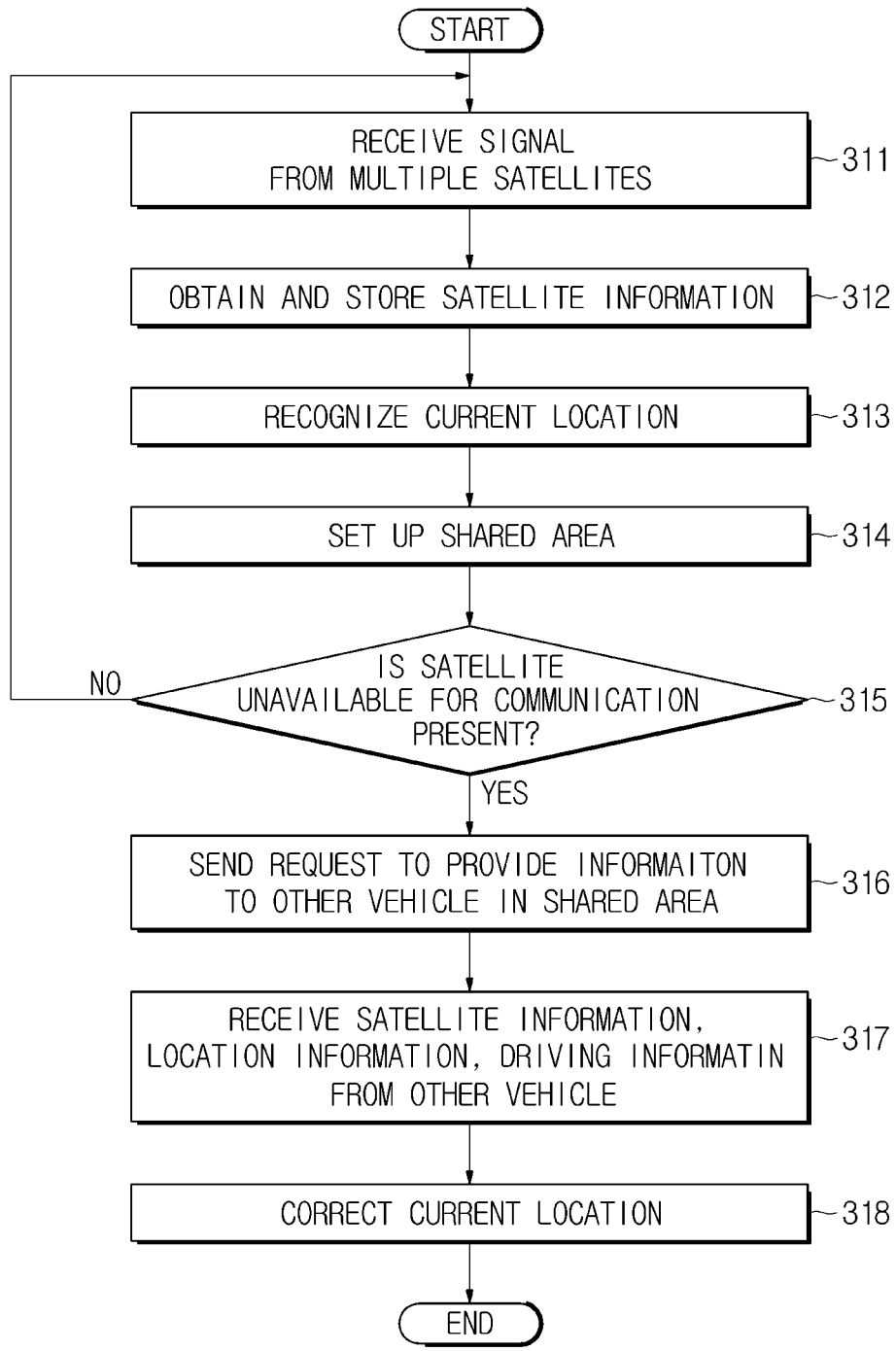

LOCATION AWARENESS APPARATUS, VEHICLE HAVING THE SAME AND METHOD FOR CONTROLLING THE APPARATUS

CROSS-REFERENCE TO RELATED APPLICATION

This application claims priority to and the benefit of Korean Patent Application No. 10-2016-0019461, filed on Feb. 19, 2016, the disclosure of which is incorporated herein by reference in its entirety.

BACKGROUND

1. Technical Field

Embodiments of the present disclosure relate generally to a location awareness technology and, more particularly, to a location awareness apparatus, a vehicle having the same, and a method for controlling the apparatus to improve accuracy of location awareness.

2. Discussion of Related Art

An autonomous vehicle is a so-called intelligent vehicle that typically has at least one of an ultrasound sensor, image sensor, laser sensor, and Light Detection and Ranging (LI-DAR) sensor and uses information from the sensor(s) to drive automatically without intervention of the driver. The vehicle can collect information relating to the driving of the vehicle with the at least one sensor and recognize objects such as obstacles located ahead. As a result, the vehicle may prevent accidents by supporting the driver's awareness of road conditions, particularly when the driver is not aware of the road condition due to the driver's carelessness, mistake, vision limitations, etc.

With the development of location awareness, sensor, and antenna technologies, intelligent vehicle receive not only guidance and traffic jam notification information but also nearby vehicles' driving information, road condition information, and message information between vehicles through services from the Intelligent Transportation System (ITS). Such information can supplement other information and can be used to further control the driving of the vehicle. Further, intelligent vehicles can use a Global Navigation Satellite System (GNSS) for location awareness. The GNSS is a system that uses an artificial satellite orbiting the earth to provide information regarding locations, altitudes, speeds, etc., of objects on the earth. The system can determine a location having the resolution of a minimum of 1 m or less, and is widely applied for military use and even in the private sector, such as guidance of locations or land surveying, emergency relief, communications of a means of transportation, such as aircrafts, ships, vehicles, etc.

The typical GNSS is configured to include a GNSS receiver for receiving signals from one or more GNSS satellites and a terrestrial monitoring station, and determine a location from a distance to the GNSS satellite by receiving signals transmitted from the GNSS satellite at the GNSS receiver. However, such location awareness using artificial satellites can suffer from low accuracy when communication with the satellite is cut off, e.g., while the vehicle is located in a city downtown, in a forest of tall buildings, or in a shadow region in the mountain.

SUMMARY OF THE DISCLOSURE

Embodiments of the present disclosure provide a location awareness apparatus, vehicle having the same, and method for controlling the apparatus, which recognizes the current location based on information from a plurality of satellites, and corrects the current location with satellite information of other nearby vehicle(s) provided from the vehicle(s).

Embodiments of the present disclosure also provide a location awareness apparatus, vehicle having the same, and method for controlling the apparatus, which recognizes the current location based on information from a plurality of satellites, corrects the current location based on satellite information of other vehicle(s), and further corrects the corrected current location with location information and driving information of the other vehicle(s).

In accordance with embodiments of the present disclosure, a location awareness apparatus equipped in a device includes: a communication unit performing communications with a plurality of satellites and with another device; and a controller recognizing a current location of the device based on information received from the plurality of satellites, controlling communications with the other device when a number of satellites available for communication is less than a reference number during the recognition of the current location, receiving satellite information from the other device, and correcting the current location based on the information received from the plurality of satellites and the satellite information received from the other device.

The controller may establish a shared area based on the current location and transmits a request for information to the other device when the other device is present in the shared area.

The controller may obtain comparison information between common satellites by comparing the information received from the plurality of satellites to the satellite information received from the other device, determine satellite information among the satellite information received from the other device which matches information of a satellite unavailable for communication with the device, and obtain information of the satellite unavailable for communication for location awareness of the device based on the determined satellite information and the obtained comparison information.

The controller may further receive location information of the other device and further corrects the current location based on a difference between the current location information and the location information of the other device.

The controller may, when receiving satellite information from a plurality of other devices, calculate corrected values of the current location based on the satellite information received from the plurality of other devices and correct the current location by averaging the calculated corrected values.

Furthermore, in accordance with embodiments of the present disclosure, a location awareness apparatus equipped in a device includes: a communication unit performing communications with a plurality of satellites and another device; and a controller recognizing a current location of the device based on information received from the plurality of satellites, receiving information of at least one satellite unavailable for communication from the other device when the other device is present in a shared area and communication with the satellite is unavailable during the recognition of the current location, and correcting the current location based on the received information of the satellite unavailable for communication.

The received information of the satellite unavailable for communication may include information about time spent attempting to receive a signal from the satellite unavailable for communication with the device and information about a distance between the satellite and the other device.

The controller may, when receiving satellite information from a plurality of other devices, obtain information of the satellite unavailable for communication based on the respective satellite information received from the plurality of other devices, calculate corrected values of the current location based on the obtained information of the satellite unavailable for communication, and correct the current location by averaging the calculated corrected values.

The controller may further receive location information of the other device and further correct the current location based on a difference between the current location information and the location information of the other device.

Furthermore, in accordance with embodiments of the present disclosure, a vehicle includes: a receiver receiving signals from a plurality of satellites; an antenna device communicating with another vehicle; and a location awareness apparatus analyzing the signals received from the plurality of satellites to obtain information of the plurality of satellites, recognizing a current location of the location awareness apparatus based on the obtained information of the plurality of satellites, using the antenna device to control communications with the other vehicle when a number of satellites available for communication is less than a reference number during the recognition of the current location, receiving satellite information from the other vehicle, and correcting the current location based on the obtained information of the plurality of satellites and the satellite information received from the other vehicle.

The location awareness apparatus may obtain comparison information between common satellites by comparing the information of the plurality of satellites and the satellite information received from the other vehicle, determine satellite information among the satellite information received from the other vehicle which matches information of a satellite from which the receiver is unable to receive a signal, and obtain information of the satellite from which the receiver is unable to receive a signal based on the determined satellite information and the obtained comparison information.

The location awareness apparatus may establish a shared area based on the current location and transmit a request for information to the other vehicle when the other vehicle is present in the shared area.

The location awareness apparatus may transmit a request for information to the other vehicle in a communication available area larger than the shared area when no other vehicle is present in the shared area.

The location awareness apparatus may further receive location information and driving information of the other vehicle and further corrects the location information based on the received location information and driving information of the other vehicle.

The location awareness apparatus may, when receiving satellite information from a plurality of other vehicles, calculate corrected values of the current location based on the satellite information received from the plurality of other vehicles and correct the current location by averaging the calculated corrected values.

The location awareness apparatus may, when receiving the location information and driving information from the plurality of other vehicles, calculate corrected values of the corrected current location based on the location information and driving information received from the plurality of other vehicles and further correct the current location by averaging the calculated corrected values.

The vehicle may further include a detector detecting speed and direction of the vehicle, and the location recognition apparatus may obtain a difference in location from the other vehicle and an amount of change in location based on the speed information and direction information detected by the detector and further corrects the current location based on the obtained difference in location and amount of change in location.

The vehicle may further include a microcomputer controlling transmission of the speed, the direction, the information received from the plurality of satellites, and the current location recognized by the location awareness apparatus when a request to provide information is received from the other vehicle.

The location awareness apparatus may determine another vehicle in communication with a number of the plurality of satellites that is greater than a reference number, establish a shared area based on a distance from the vehicle to the determined other vehicle, and transmit a request for information to the other vehicle when the other vehicle is present in the shared area.

The antenna device may further communicate with an infrastructure, and the location awareness apparatus may correct the current location based on information obtained from the communications with the infrastructure.

Furthermore, in accordance with embodiments of the present disclosure, a method for controlling a location awareness apparatus equipped in a vehicle includes: analyzing signals from a plurality of satellites received by a receiver to obtain information of the plurality of satellites; recognizing a current location of the location awareness apparatus based on the obtained information of the plurality of satellites; establishing a shared area based on the current location; using an antenna device to transmit a request for information to another vehicle present in the shared area when a number of satellites available for communication during the recognition of the current location is less than a reference number; receiving satellite information from the other vehicle; and correcting the current location based on the obtained information of the plurality of satellites and the satellite information received from the other vehicle.

The method may further include receiving location information and driving information from the other vehicle; and further correcting the current location based on the location information and driving information received from the other vehicle.

The further correcting of the corrected location may include: obtaining an initial difference in location by comparing the recognized current location information to the location information received from the other vehicle; obtaining an amount of change in location of the other vehicle per unit time based on speed information and direction information received from the other vehicle; and correcting the current location based on information about the corrected current location, the initial difference in location, and the amount of change in location per unit time.

The further correcting of the corrected location may include: calculating corrected values of the current location based on satellite information received from a plurality of other devices, and correcting the current location by averaging the calculated corrected values.

The method may further include, when location information and driving information is received from a plurality of other vehicles, calculating corrected values of the current location based on the location information and driving information received from the plurality of other vehicles; and further correcting the current location by averaging the calculated corrected values.

BRIEF DESCRIPTION OF THE DRAWINGS

The above and other objects, features and advantages of the present disclosure will become more apparent to those of ordinary skill in the art by describing in detail embodiments thereof with reference to the accompanying drawings, in which:

FIG. 10 is a flowchart of controlling a location awareness apparatus, according to embodiments of the present disclosure.

DETAILED DESCRIPTION OF THE EMBODIMENTS

Figure 1:
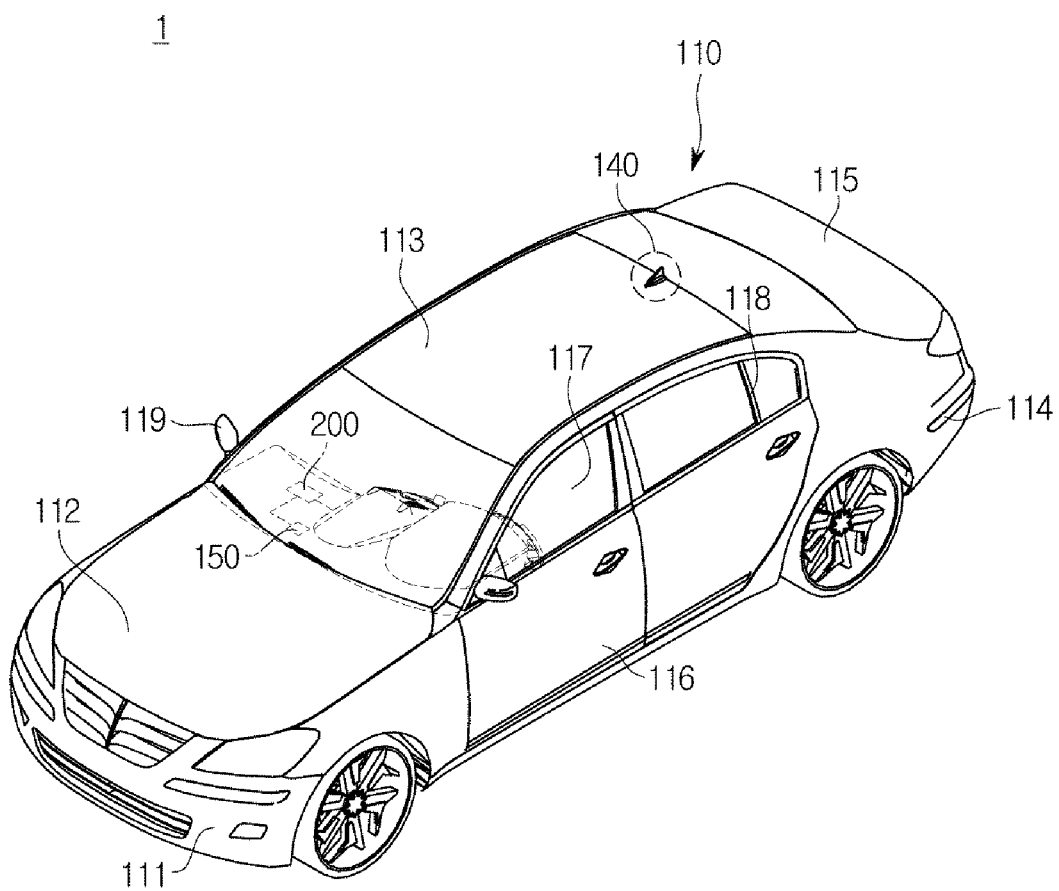
FIG. 1 shows a vehicle equipped with a location awareness apparatus, according to embodiments of the present disclosure.

Hereinafter, embodiments of the present disclosure will be described with reference to accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the presently disclosed embodiments, a location awareness apparatus is equipped in a device for recognizing a current location of the device in order for the device to control movement and perform location-based functions. The device may be, for example, one of terminals (e.g., computer or computing devices), vehicles, ships, aircrafts, and robots that are movable and able to communicate.

The location awareness apparatus may communicate with a plurality of satellites, a plurality of infrastructures, and other device(s), recognize a current location of the device based on information from the plurality of satellites and information from the plurality of infrastructures, correct the current location based on satellite information provided from other device(s) through communication with the other device(s), and output information about the corrected current location to a load.

The load herein may be, for example, a microcomputer to control movement or perform a predetermined function based on the location information. The microcomputer corresponds to a controller included in the device, which may be implemented with a processor, a Central Processing Unit (CPU), or Micro Controller Unit (MCU).

A vehicle 1 equipped with a location awareness apparatus 200 will now be described.

Figure 2:
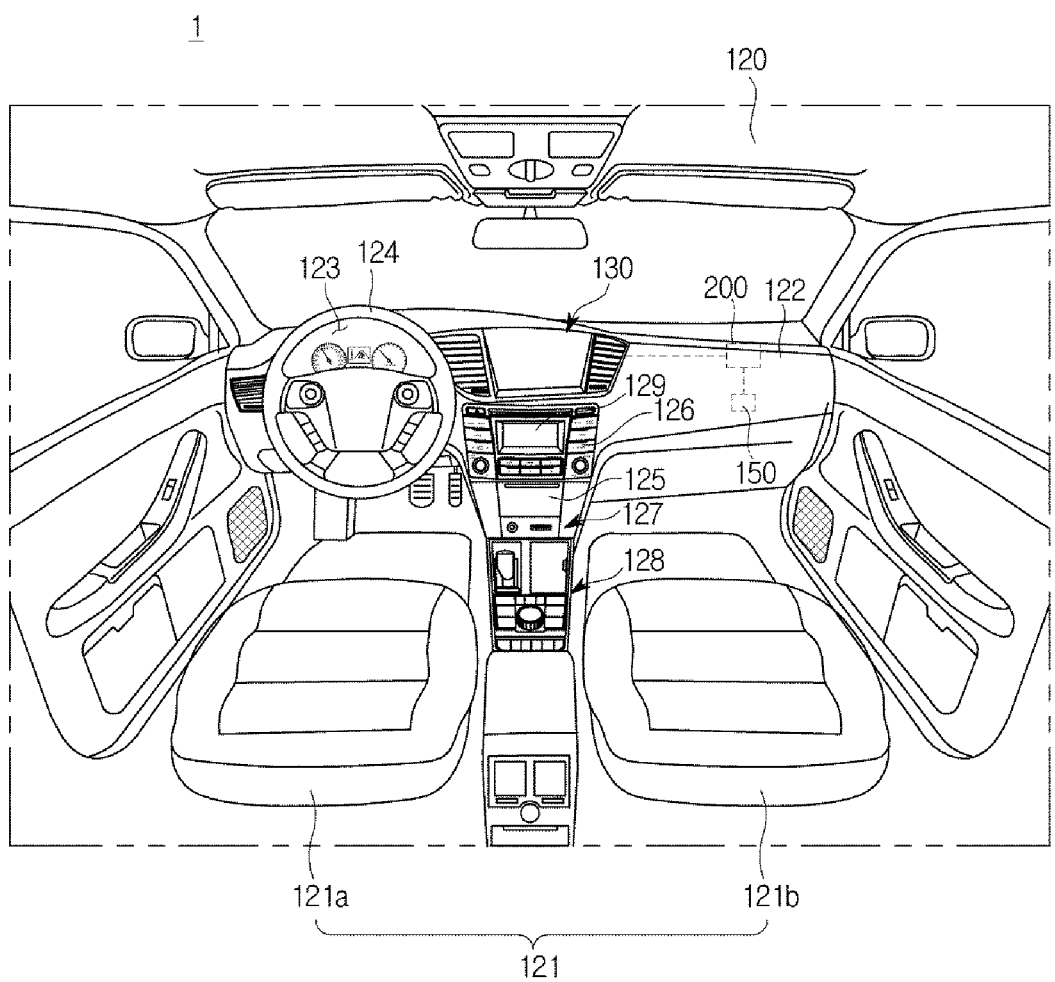
FIG. 2 shows the interior of the vehicle shown in FIG. 1.

FIG. 1 shows a vehicle equipped with a location awareness apparatus, according to embodiments of the present disclosure, and FIG. 2 shows the interior of the vehicle shown in FIG. 1.

The vehicle 1, as is known in the art, is a machine that drives wheels for the purpose of transportation. The vehicle 1 includes a body with exterior and interior parts, and remaining parts, i.e., a chassis on which mechanical devices required for driving are installed.

As shown in FIG. 1, the exterior part 110 of the body includes a front bumper 111, a hood 112, a roof panel 113, a rear bumper 114, a trunk 115, front, back, left and right doors 116, etc. The exterior part 110 of the body further includes windows 117 mounted on the front, back, left and right doors 116, and fillers 118 arranged on the borders between the windows 117.

Furthermore, the windows 117 further include side windows, quarter windows installed between the fillers 118 which may not be opened, a rear window installed on the back, a front window installed on the front.

The exterior part 110 of the body further includes side mirrors 119 that helps the driver see areas behind the vehicle 1. It should be noted that the exterior arrangement of the vehicle 1 shown in FIG. 1 is presented merely for demonstration purposes and does not limit the scope of the present disclosure nor the claims defined herein.

Referring now to FIG. 2, the interior part 120 of the body includes seats 121 (121a and 121b), a dashboard 122, an instrument cluster (or cluster) 123 placed on the dashboard, containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a steering wheel 124 for steering control of the vehicle, and a center fascia 125 having a control pad for audio equipment and air conditioning (AC) and ventilation system.

The seats 121 includes a driver seat 121a, a passenger seat 121b, and back seats located in the back of the interior of the vehicle 1.

The center fascia 125 is located on the dashboard between the driver seat 121a and the passenger seat 121b, including a head unit 126 for controlling the audio system, AC and ventilation system, and seat heaters.

Air vents, a cigar jack, etc., may be installed on the center fascia 125 and there may be a multi terminal 127 installed on or near the center fascia 125.

The multi terminal 127 may be arranged to be close to the head unit 146, including a universal serial bus (USB) port and an auxiliary (AUX) terminal, and optionally an SD slot. It should be noted that the interior arrangement of the vehicle 1 shown in FIG. 2 is presented merely for demonstration purposes and does not limit the scope of the present disclosure nor the claims defined herein.

The vehicle 1 may further include an input unit 128 for receiving commands to operate various functions, and a display 129 for displaying information about an activated function and information input by the user. The vehicle 1 may further include a vehicle terminal 130 for outputting a result corresponding to the information input by the user.

Specifically, the input unit 128 may be arranged on the head unit 126 and center fascia 125, including at least one mechanical button, such as ON/OFF buttons for operation of various functions, buttons to change settings of various functions, etc. The input unit 128 may also include a jog dial (not shown) or touch pad for inputting a command to move or select a cursor displayed on the vehicle terminal 130. The jog dial or touch pad may be arranged on the center fascia.

Furthermore, the input unit 128 may receive a selection of passive driving mode in which the driver drives the vehicle by him/herself and autonomous driving mode, a navigation function, and information about a destination in receiving the navigation function.

The vehicle terminal 130 may perform at least one of navigation, DMB, audio, and video functions, and display road condition information, driving information, and the like while in the autonomous driving mode. The vehicle terminal 130 may also be implemented with a touch screen in which a touch panel and a display panel are integrated.

The chassis of the vehicle 1 further includes a power generating system, a power transfer system, a traveling gear, a steering system, a braking system, a suspension system, a transmission system, a fuel system, front, rear, left, and right wheels, etc.

The vehicle 1 further includes various safety systems for safety of the driver and passengers. The safety systems may include an airbag control unit for the purpose of the safety of driver and passengers in case of car crashes and an Electronic Stability Control (ESC) unit for stabilizing the vehicle's position while the vehicle 1 is accelerating or cornering.

In addition, the vehicle 1 may further include at least one detector, such as an approximation sensor for detecting an obstacle or other vehicle approaching to the sides or behind, a rain sensor for detecting whether it is raining and the amount of rainfall, a wheel speed sensor for detecting the speed of the wheels of the vehicle 1, a lateral acceleration sensor for detecting lateral acceleration of the vehicle 1, a yaw rate sensor for detecting a change in angular velocity of the vehicle 1, a gyro sensor, a steering angle sensor for detecting turning of the steering wheels of the vehicle 1, etc.

The vehicle 1 includes an ECU for controlling operation of the power generating system, power transfer system, traveling gear, steering system, braking system, suspension system, transmission system, fuel system, various safety systems and sensors.

Furthermore, the vehicle 1 may optionally include electronic devices, such as a hands-free system, audio equipment and Bluetooth device, a rear camera, a charging system for a terminal, E-Z pass (hi-pass in Korea) equipment, etc.

The vehicle 1 may further include an engine start button to provide an operation instruction to a start motor (not shown). Specifically, pushing the engine start button drives the start motor, which in turn drives the power generating system, i.e., an engine (not shown).

The vehicle 1 further includes a battery (not shown) electrically connected to the vehicle terminal, audio equipment, indoor lighting system, start motor, and other electronic devices for supplying power. The battery is charged by means of dynamic power of the internal generator or the engine while the vehicle is being driven.

Furthermore, the vehicle 1 may further include an antenna device 140 mounted on the roof panel 113 for receiving radio signals, broadcast signals, satellite signals, and signals from other vehicles, a server of an intelligent transportation system (ITS), and/or an infrastructure (i.e., a base station), and a receiver 150 for receiving signals from a plurality of satellites. In addition, the vehicle 1 may further include a location awareness apparatus 200 for recognizing a current location of the vehicle 1 (itself) using signals received through the antenna device 140 and receiver 150.

The receiver 150 as herein used may be a GPS receiver, also referred to as a Global Navigation Satellite System (GNSS) or GLONASS.

Communication configuration of the vehicle 1 including the antenna device 140, GPS receiver 150, and location awareness apparatus 200 will be described in connection with FIG. 3.

Figure 3:
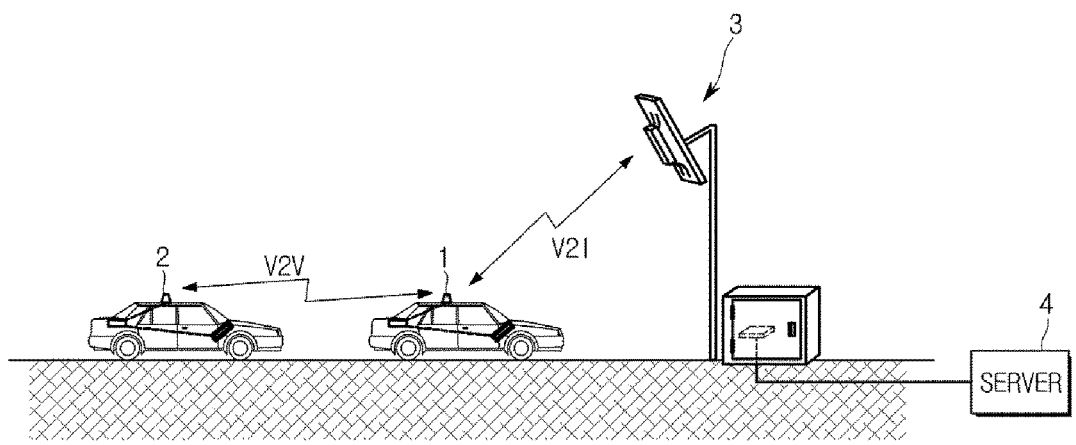
FIG. 3 shows communication of a vehicle equipped with a location awareness apparatus, according to embodiments of the present disclosure.

As shown in FIG. 3, communication V2V between a first vehicle (vehicle 1) and a second vehicle 2 (i.e., "another vehicle" or the "other vehicle") and communication V2I among the vehicles 1 and 2, an infrastructure 3, and a server 4 will be described.

The first vehicle 1 may be aware of its current location by receiving satellite signals through the GPS receiver 150, and transmit signals of various information in the form of electromagnetic waves through the antenna device 140.

Specifically, the antenna device 140 of the first vehicle 1 may transmit electromagnetic waves corresponding to an electric signal delivered from the ECU equipped in the first vehicle 1.

The second vehicle 2 may receive electromagnetic waves transmitted through the antenna device 140 of the first vehicle 1 through its own antenna device. The antenna device of the second vehicle 2 demodulates the received electromagnetic waves and converts them into electric signals, and sends the electric signals to its ECU.

The ECU of the second vehicle 2 generates a control signal corresponding to the electric signal and uses the control signal to control the second vehicle 2. On the contrary, the antenna device of the second vehicle 2 may produce an electric signal based on a control signal sent from the ECU of the second vehicle 2, and transmit electromagnetic waves corresponding to the electric signal.

The first vehicle 1 may then receive the electromagnetic waves transmitted from the second vehicle 2 through the antenna device 140, and convert the received electromagnetic waves to an electric signal.

The first vehicle 1 may generate a control signal corresponding to the electric signal and use the control signal for controlling the first vehicle 1. Accordingly, vehicle to vehicle communication (e.g., V2V communication) may be implemented. In other words, the first vehicle and the second vehicle may exchange their respective location information, driving information, road condition information, satellite information, etc.

Radio signals transmitted/received through the antenna device may be signals according to a second generation (2G) communication scheme, such as Time Division Multiple Access (TDMA), Code Division Multiple Access (CDMA), etc., a third generation (3G) communication scheme, such as Wide Code Division Multiple Access (WCDMA), Code Division Multiple Access 2000 (CDMA2000), Wireless Broadband (Wibro), World Interoperability for Microwave Access (WiMAX), etc., a fourth generation (4G) communication scheme, such as Long Term Evolution (LTE), Wireless Broadband Evolution (Wibro Evolution), a fifth generation (5G) communication scheme, or the like.

Moreover, the infrastructure 3 on a road or the server 4 may receive electromagnetic waves transmitted from the antenna device of at least one of the first and second vehicles 1 and 2 or transmit electromagnetic waves.

The server 4 may deliver traffic information, road condition information, etc., provided from a plurality of vehicles to a plurality of vehicles.

The infrastructure 3 on a road may exchange control signals with the server 4.

Specifically, the infrastructure 3 may receive electromagnetic waves transmitted through the antenna device 140 of the first vehicle 1, deliver an electric signal corresponding to the received electromagnetic waves to the server 4, and/or convert an electric signal sent from the server 4 to electromagnetic waves and transmit the electromagnetic waves.

In this case, the antenna device 140 of the first vehicle 1 may receive electromagnetic waves delivered from the infrastructure 3, and the ECU of the first vehicle 1 may generate a control signal for one of various parts of the first vehicle 1, e.g., for the vehicle terminal, based on the electric signal corresponding to the received electromagnetic waves and deliver the control signal to the part of the vehicle 1.

Accordingly, communication between vehicles and infrastructure 3 (e.g., V2I communication) may be enabled.

For example, the first and second vehicles 1 and 2 may receive location information, road condition information, etc., of the infrastructure 3 through the V2I communication.

As such, a vehicle may obtain various information required for driving by activating a wireless vehicle network V2X (Vehicle to everything communication), such as the V2V and V2I.

Figure 4:
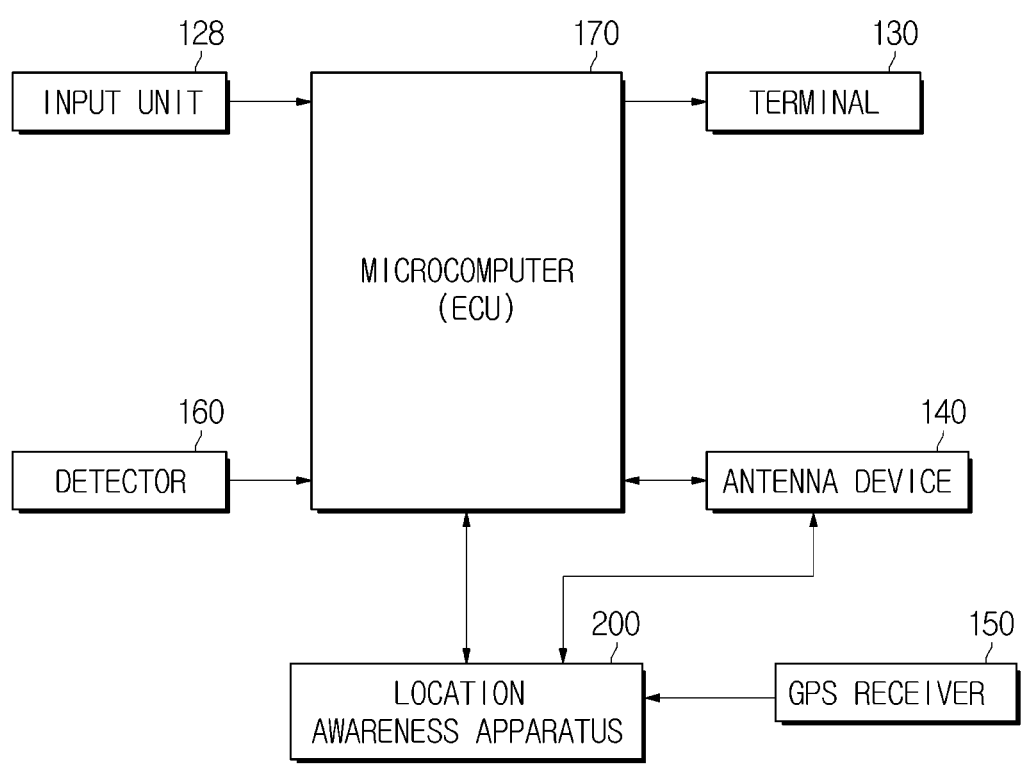
FIG. 4 is a control block diagram of a vehicle equipped with a location awareness apparatus, according to embodiments of the present disclosure.

FIG. 4 is a control block diagram of a vehicle equipped with a location awareness apparatus, according to an embodiment of the present disclosure.

The vehicle 1 may include the input unit 128, the terminal 130, the antenna device 140, a GPS receiver 150, a detector 160, the microcomputer 170, and the location awareness apparatus 200.

The input unit 128 may receive a selection of location awareness mode. The input unit 128 may also receive a command to perform a location awareness based autonomous driving mode, a command to perform the navigation function, etc.

The terminal 130 may output an image and sound for a function currently being performed. For example, the terminal 130 may output information about the navigation function or information about the autonomous driving mode.

The information about the navigation function may include information about a current location, a map image of an area within a certain distance from the current location, a route guidance image, a route guidance sound, a vehicle speed, a destination, etc. The information about the autonomous driving mode may include information about a current location, a vehicle speed, a direction, a surrounding road condition, a surrounding road image, a location of a nearby vehicle, etc.

The antenna device 140 may exchange radio waves with other vehicle(s), one or more infrastructures 3, and the server 4 to communicate.

The antenna device 140 may send a request to provide information or send a signal about location information and driving information of the vehicle 1 to other vehicle in communication with the vehicle 1. The antenna device 140 may receive location information and driving information or a request to provide information sent from the other vehicle.

The GPS receiver 150 may communicate with a plurality of satellites. Specifically, the GPS receiver 150 may receive radio signals sent from a plurality of satellites, and analyze the received radio signals to obtain respective information of the plurality of satellites.

The information of a satellite (or "satellite information") as herein used may include information about identification of the satellite and information about time at which the satellite transmits the signal.

The detector 160 may detect driving information of the vehicle 1. The driving information as herein used may include information about the speed of the vehicle and information about a direction of the vehicle. The detector 160 may include at least one of a wheel speed detector for detecting the speed of the front, back, left and right wheels, an acceleration detector for detecting acceleration of the vehicle, and an angular speed detector for detecting the angular speed of the vehicle.

The microcomputer 170 may determine whether a function being performed requires location information of the vehicle, and if it is determined that the function requires location information of the vehicle, activate the location awareness apparatus 200 to perform the location awareness function.

A function requiring the location information of the vehicle may correspond to a navigation function, an autonomous driving function, or a recommendation function to recommend a restaurant, hospital, mart, parking lot, etc.

The microcomputer 170 may receive current location information recognized by the location awareness apparatus 200 and control the function being currently performed based on the current location information. The microcomputer 170 may control transmission/reception of information through the antenna device 140. Specifically, the microcomputer 170 may modulate a signal about information to be transmitted to other vehicle into radio waves and transmit the radio waves through the antenna device 140, or demodulate radio waves received through the antenna device 140 to obtain information sent from other vehicle or an infrastructure.

Once receiving a request to provide information from other vehicle, the microcomputer 170 may send satellite information and location information stored in the location awareness apparatus 200 and driving information detected by the detector 160 to the other vehicle.

The microcomputer 170 may send satellite information received by the GPS receiver 150 to the other vehicle as well. The microcomputer 170 may send a request to provide information to the other vehicle 2 once receiving the request to provide information of the other vehicle 2 from the location awareness apparatus 200. The microcomputer 170 may also be implemented with a CPU, a processor, and/or an MCU, or may correspond to the ECU equipped in the vehicle 1.

Upon reception of a command to activate operation, the location awareness apparatus 200 may activate the GPS receiver 150 and antenna device 140, and receive information from them to perform location awareness of the vehicle 1.

Figure 5:
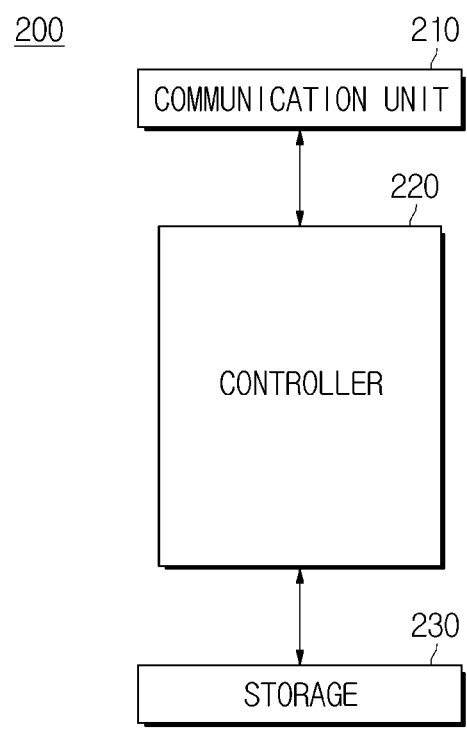
FIG. 5 is a control block diagram of a location awareness apparatus, according to embodiments of the present disclosure.

Referring now to FIG. 5, the location awareness apparatus 200 may include a communication unit 210, a controller 220, and a storage 230.

The communication unit 210 may perform communication between the controller 220 and the GPS receiver 150, and between the controller 220 and the antenna device 140. The communication unit 210 may transmit a signal about some information through the antenna device 140 or send information about a signal received through the antenna device 140 to the controller 220, under the control of the controller 220.

Once the command to activate operation is received, the controller 220 may analyze a signal received from the GPS receiver 150 to obtain time information and identification information of a satellite, control the identification information of the satellite to be stored, and use the obtained multiple pieces of time information of the plurality of satellites to recognize the current location of the vehicle.

The controller 220 may transmit a request to provide information (i.e., a request for information) to other vehicle if the number of satellites available for communication is less than a reference number while recognizing the current location.

The number of satellites available for communication, as herein used, is the number of a plurality of satellites that are sending signals used for awareness of the current location, and the reference number can be defined as the minimum number of satellites required for location awareness.

Furthermore, the controller 220 may establish a shared area based on the current location and a pre-stored radius before sending a request to provide information to the other vehicle(s), and control communication with the other vehicle(s) in the shared area to send the request to provide information to the other vehicle(s).

The shared area as herein used may be an area available to receive signals from the same or similar number of satellites or an area available to receive the same satellite(s). Specifically, the shared area may be an area in which the number of satellites that the vehicle 1 and other vehicle(s) have in common to receive signals to recognize their current locations is equal to or greater than a reference number.

Accordingly, the controller 220 may obtain satellite information to recognize the current location of the vehicle 1 from other vehicle by receiving the information from the other vehicle within the shared area.

The controller 220 may determine a plurality of satellites to recognize the current location of the vehicle 1, determine other vehicle that is receiving signals from the same satellites as the determined satellites, and establish a shared area based on a distance to the other vehicle.

The controller 220 may compare identification information of satellites used in location awareness of the vehicle 1 to respective identification information of satellites used in location awareness of other vehicles, and transmit a request to provide information to one of the other vehicles that has the most satellites in common with the vehicle 1. Also, the controller 220 may compare identification information of satellites used in location awareness of the vehicle 1 to respective identification information of satellites used in location awareness of other vehicles, and transmit a request to provide information to one or more of the other vehicles that has more than a reference number of satellites in common with the vehicle 1.

Alternatively, the controller 220 may determine a satellite unavailable for communication among satellites used in location awareness of the vehicle 1, determine other vehicle that performs location awareness using the determined satellite, and send a request to provide information to the other vehicle.

The controller 220 may receive satellite information, location information, and driving information of other vehicle in communication with the vehicle 1, make first correction on the current location based on the satellite information of the other vehicle, and make second correction on the corrected current information based on the location information and driving information of the other vehicle. More specifically, the controller 220 may obtain an initial difference between a current location of the vehicle 1 and a current location of other vehicle, obtain an amount of change in location of the other vehicle per unit time based on speed information and direction information of the other vehicle, and obtain second corrected location information by reflecting the initial difference in location and the amount of change in location per unit time on the first corrected location information.

Furthermore, the controller 220 may determine an amount of change between the speed of the vehicle 1 and the speed of the other vehicle, obtain an amount of change between the direction of the vehicle 1 and the direction of the other vehicle, and determine an amount of change in location per unit time based on the determined amounts of change in speed and direction.

If no other vehicle is located in the shared area, the controller 220 may control communication with other vehicle present in a communication available area, and correct the current location using information provided from the other vehicle present in the communication available area.

The communication available area, as used herein, refers to an area having a radius larger than that of the shared area.

The information provided from the other vehicle present in the communication available area may include satellite information, location information, and driving information of the other vehicle.

Once satellite information of a plurality of other devices is received, the controller 220 may expect respective corrected values of the current location based on the satellite information of the plurality of other devices, and correct the current location by averaging the expected corrected values of the current location. Furthermore, once satellite information, location information, and driving information of a plurality of other devices are received, the controller 220 may expect first corrected values of the current location based on the satellite information of the plurality of other devices, expect second corrected values based on the location information and driving information of the plurality of other vehicles, make first correction on the current location by averaging the first corrected values, and make second correction on the first corrected location by averaging the second corrected values.

In addition, once satellite information, location information, and driving information of a plurality of other devices are received, the controller 220 may obtain second corrected locations using the information of the respective vehicles and obtain a final location by averaging the second corrected locations of the respective vehicles.

The controller 220 may recognize the current location by analyzing information of more than a reference number (e.g., at least four) of satellites, which is received by the GPS receiver.

The controller 220 may divide satellites into first satellites available for communication with a plurality of satellites used in location awareness of the vehicle 1 and second satellites unavailable for communication, recognize the current location using received information of the first satellite (i.e., first satellite information), obtain comparison information by comparing first satellite information of the vehicle 1 and first satellite information of other vehicle, expect information of the second satellite of the vehicle 1 (i.e., second satellite information (of the vehicle 1)) based on the obtained comparison information and second satellite information of the other vehicle, and correct the current location based on the expected second satellite information of the vehicle 1.

Information from the satellite unavailable for communication may be obtained from the satellite available for communication using the principle of the area of a triangle.

There may be a plurality of first satellites of the vehicle 1, and there may be at least one second satellite of the vehicle 1. The vehicle 1 and the other vehicle may have the first satellite and second satellite in common.

Since the vehicle 1 may not receive any information from the second satellite, it may obtain virtual second satellite information by expecting the second satellite information using the second satellite information received by the other vehicle.

The expected second satellite information may include information about a distance to the second satellite unavailable to communicate with the vehicle 1, and/or time information.

The vehicle 1 may change the second satellite information of the other vehicle to information that would be received by the vehicle 1, by using the location information and driving information of the vehicle 1 and the location information and driving information of the other device.

Once satellite information is received from a plurality of other vehicles, the controller 220 may expect respective pieces of information of a satellite unavailable for communication based on the respective satellite information of the plurality of other vehicles, calculate respective corrected values of the current location based on the respective expected information of the satellite unavailable for communication, obtain a mean value by averaging the respective corrected values, and correct the current location using the obtained mean value.

Furthermore, the controller 220 may identify a satellite in common between two vehicles based on identification information of satellites. If there is one satellite available for reception of information, the controller 220 may check information about a previously recognized location, determine an amount of change in location based on the driving information, expect the current location based on the determined current location and the amount of change in location, and correct the current location based on the expected current location and information of the other vehicle. If there is one satellite available for reception of information, the controller 220 may also expect the current location based on driving information of the vehicle 1, and satellite information, location information, and driving information of the other vehicle.

The controller 220 may receive location information from a terrestrial infrastructure to increase accuracy of location awareness, and correct the current location based on the location information of the infrastructure.

If the number of satellites available for communication during awareness of the current location is less than a reference number, the controller 220 may correct the current location based on location information provide from a nearby infrastructure.

Upon reception of a request to provide information, the controller 220 may send the current location information, driving information, and satellite information of the vehicle 1 to the requesting other vehicle.

The storage 230 may store identification information of the vehicle 1 and a reference number of satellites for location awareness. The storage 230 may store a radius for establishing a shared area.

Furthermore, once a shared area is established, the storage 230 may store information about the shared area.

The storage 230 may store identification information of a satellite transmitting a signal used in location awareness.

The identification information to be stored may be changed with movement of the vehicle 1. The storage 230 may also store the identification information of a satellite used in location awareness of other vehicle in communication with the vehicle 1.

Figure 6:
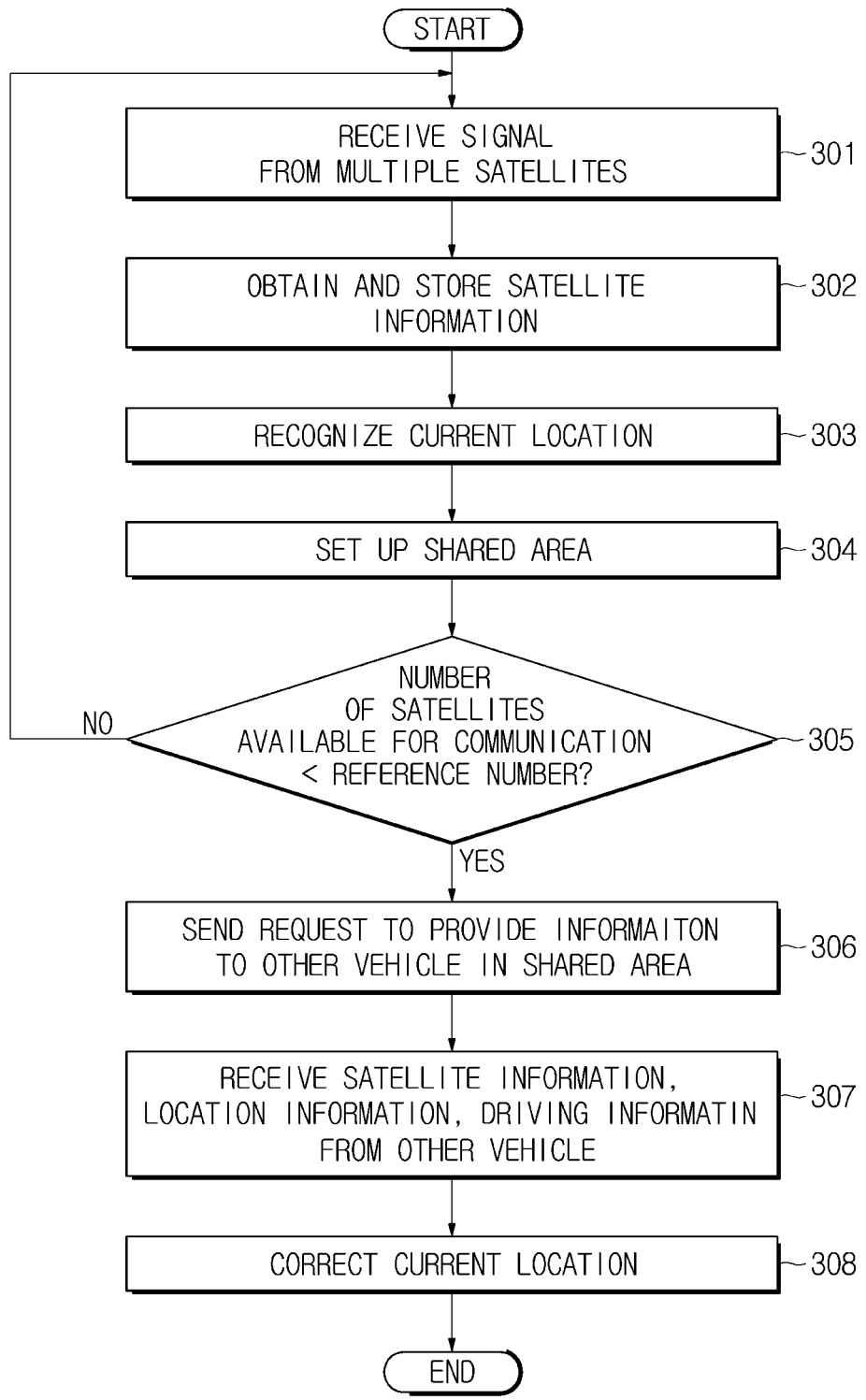
FIG. 6 is a flowchart of controlling a location awareness apparatus, according to embodiments of the present disclosure.

FIG. 6 is a flowchart of controlling a location awareness apparatus, according to embodiments of the present disclosure. Operation of the location awareness apparatus equipped in the vehicle 1 will now be described.

The vehicle 1 activates operation of the location awareness apparatus once a function based on location awareness is selected.

The location awareness apparatus activates operation of the GPS receiver 150 and antenna device 140 once receiving a command to activate operation. The location awareness apparatus receives signals of a plurality of satellites through the GPS receiver 150 in operation 301, and obtains information about time at which the respective satellites transmit the signals by analyzing the received signals.

The location awareness apparatus also determines and stores identification information of the satellites from which the signals are received, in operation 302.

The location awareness apparatus obtains distances between the vehicle 1 and the respective satellites by comparing the information about time at which the signal is transmitted from each satellite to information about time at which the signal is received by the GPS receiver 150, and recognizes the current location of the vehicle 1 based on the obtained distances, in operation 303.

As an example, a location awareness method using at least four satellites will now be described.

The location awareness apparatus obtains a distance between a first satellite and a receiving location by calculating a distance light traveled based on a time difference between time information contained in radio waves transmitted from the first satellite and time at which the GPS receiver 150 receives the radio waves, and uses the distance to measure a distance between the first satellite and the vehicle 1.

A first current location is determined based on the measured distance, which is located on a spherical plane centered on the first satellite. In this way, the location awareness apparatus measures a distance to a second satellite and a distance to a third satellite as well.

The location awareness apparatus may recognize a circle where the spherical planes centered on the first and second satellites are met to be a second current location according to the distance to the second satellite, obtain points of intersection between the circle measured from the first and second satellites and the distance to the third satellite, and recognize the two points on the circle as third current locations. However, if one of the two points is located in somewhere impossible, such as outer space or deep in the earth, the other point corresponds to the third current location of the vehicle 1.

The location awareness apparatus may recognize a final current location by setting a time difference from a fourth satellite and correcting the difference by synchronizing time of the GPS receiver 150 to that of the fourth satellite.

The location awareness apparatus may enable the vehicle 1 to perform a location awareness based function by recognizing the location of the vehicle 1 while the vehicle 1 is driven and sending the recognized location to the microcomputer 170.

The location awareness apparatus establishes a shared area based on the current location and a radius stored in advance while recognizing the current location of the vehicle 1, in operation 304. Alternatively, the shared area may be established based on a distance from the vehicle to the other vehicle.

Specifically, the location awareness apparatus may communicate with other nearby vehicle(s) through the antenna device 140, check identification information of a satellite used in location awareness of the other vehicle, determine if the number of satellites the vehicle 1 and the other vehicle have in common is equal to or greater than a reference number by comparing identification information of satellites of the other vehicle with identification information of satellites of the vehicle 1, obtain a distance to the other vehicle by comparing the location information of the other vehicle and the location information of the vehicle 1, if the number of satellites the vehicle 1 and the other vehicle have in common is equal to or greater than the reference number, and establish the shared area based on the obtained distance.

If there are a plurality of other vehicles present around the vehicle 1, the location awareness apparatus may check identification information of satellites of the plurality of other vehicles, determine which ones of the plurality of other vehicles have more than the reference number of satellites shared with the vehicle 1, determine which one of the determined other vehicles is farthest from the vehicle 1 by comparing location information of the determined other vehicles and the location information of the vehicle 1, and establish the shared area based on the distance between the vehicle 1 and the farthest other vehicle.

The location awareness apparatus determines the number of satellites from which signals are received during recognition of the current location of the vehicle 1, and determines whether the determined number of satellites is less than a reference number, in operation 305.

If it is determined that the number of satellites from which signals are received is less than the reference number, the location awareness apparatus sends a request to provide information to other vehicle located in the established shared area, in operation 306.

If a plurality of other vehicles are located in the shared area, the location awareness apparatus may send the request to provide information to the plurality of other vehicles or may selectively send the request to at least one of the plurality of other vehicles.

If it is determined that there is no other vehicle present in the shared area, the location awareness apparatus may receive location information from a nearby infrastructure. Alternatively, if it is determined that there is no other vehicle present in the shared area, the location awareness apparatus may send a request to provide information to other vehicle present in a communication available area.

Figure 7A:
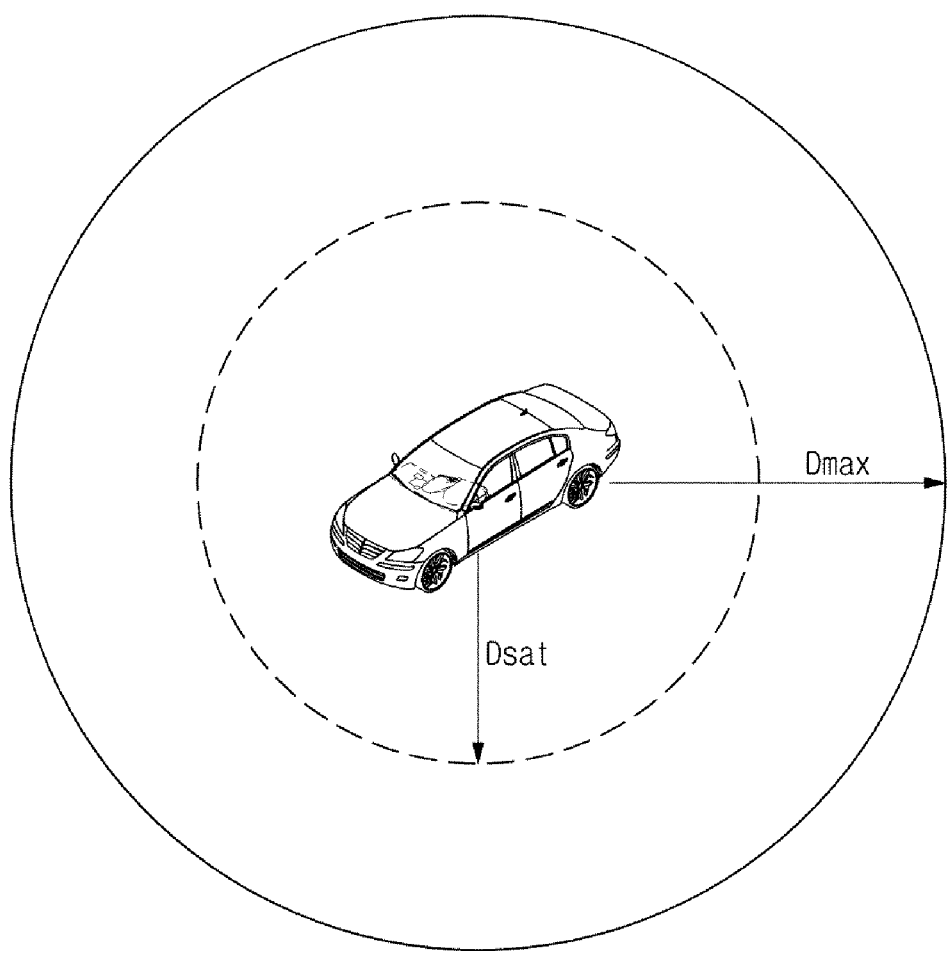
FIGS. 7A and 7B show depictions of establishing a shared area and storing satellite information in a location awareness apparatus, according to embodiments of the present disclosure.

Referring now to FIG. 7A, a communication available area Dmax is as large an area as possible in which the vehicle 1 is allowed to communicate with other vehicle through the antenna device 140, and has a radius greater than that of the shared area Dsat.

Figure 7B:
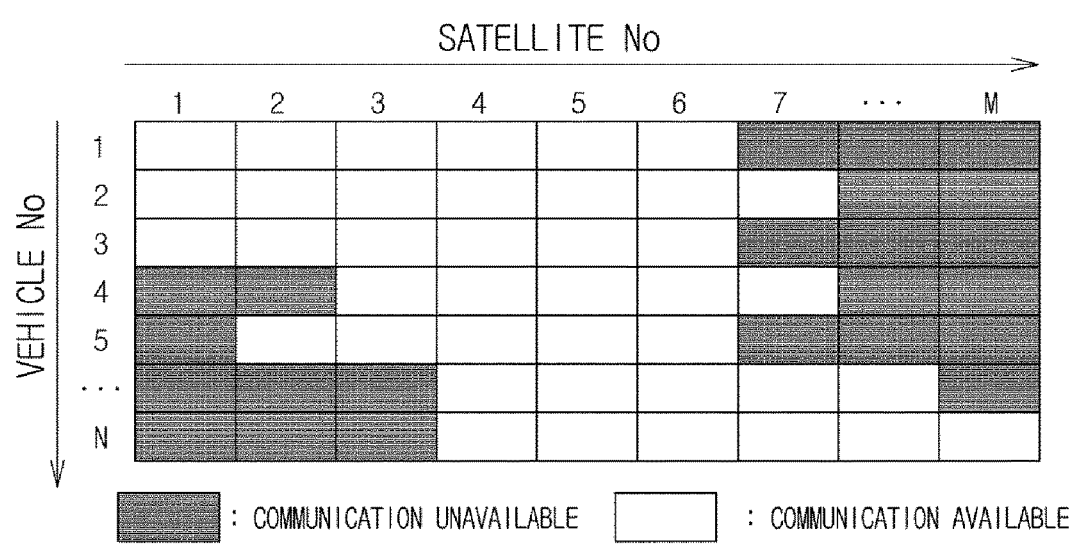

As shown in FIG. 7B, assume that there are satellites 1 to 6 available to communicate with the vehicle 1, the location awareness apparatus may send a request to provide information to other vehicles 2 and 3 that receive signals from the satellites 1 to 6, and in return, receive information from the other vehicles 2, 3.

Other vehicles 2 and 3 may be located in the shared area, and other vehicles 4 to N are located in the communication available area.

If other vehicles 2 and 3 refuse to provide information or communication with them is cut off, the location awareness apparatus may send a request to provide information to other vehicles 4 to N in the communication available area.

The location awareness apparatus receives satellite information, location information, and driving information provided by the other vehicle, in operation 307, and uses the information of the other vehicle to correct the current location, in operation 308, and sends the current location information to the microcomputer 170.

If satellites for location awareness are lacking, the location awareness apparatus may receive information of at least one satellite from other vehicle to correct the current location.

Configuration to correct the recognized current location will be described in more detail in connection with FIGS. 8, 9A, 9B, and 9C.

The location awareness apparatus periodically checks and stores information of a plurality of satellites used in location awareness, and determines whether there is a satellite unavailable for communication by comparing information of neighboring satellites in time.

Figure 8:
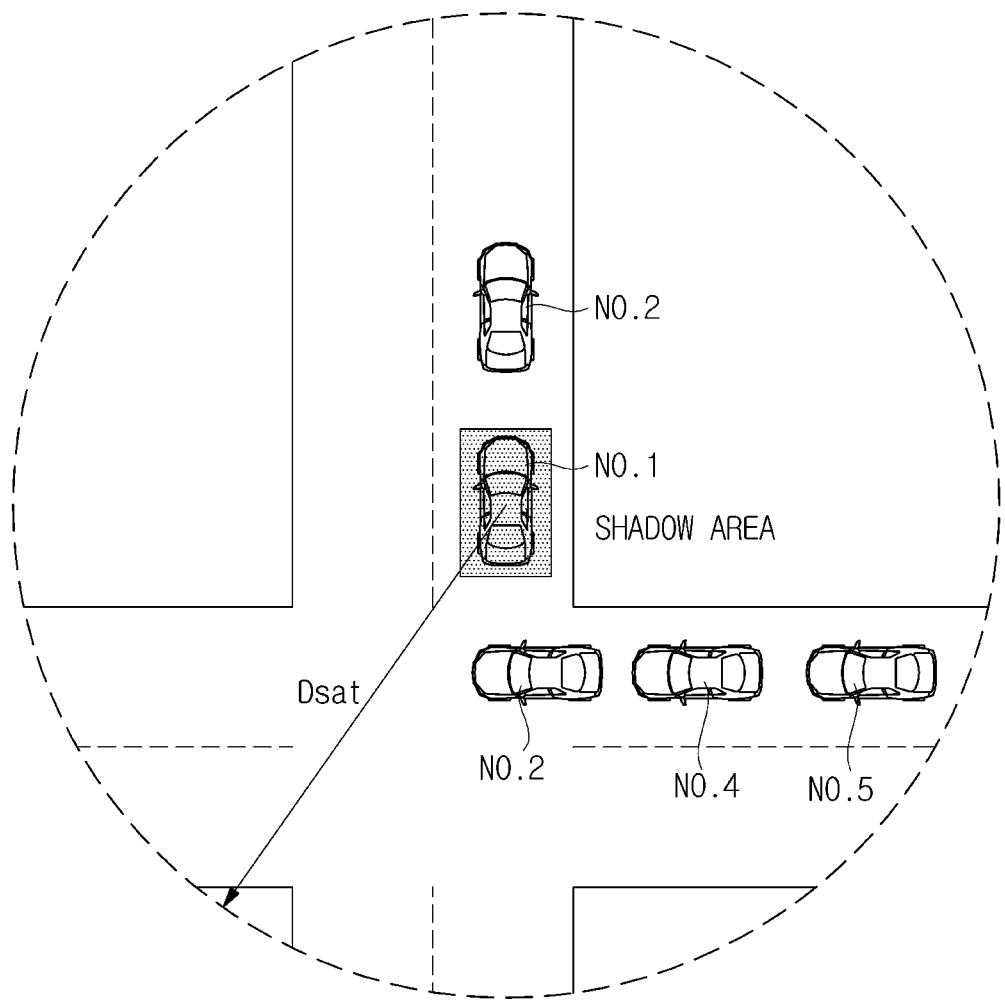
FIG. 8 shows communication of a vehicle equipped with a location awareness apparatus, according to embodiments of the present disclosure.

Referring first to FIG. 8, the location awareness apparatus establishes the shared area Dsat while performing location awareness, and communicates with other vehicles 2, 3, 4, and 5 in the shared area Dsat.

Figure 9A:
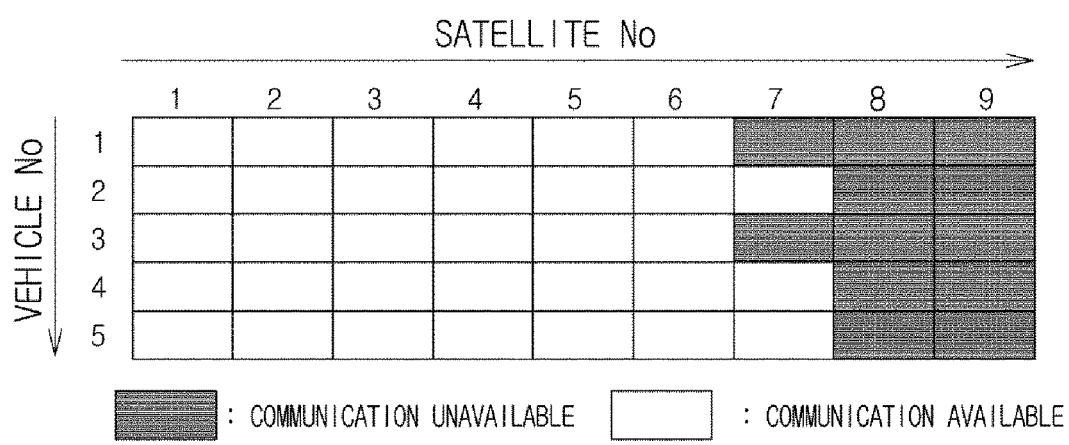
FIGS. 9A, 9B, and 9C show satellite information of other vehicles stored in a vehicle equipped with a location awareness apparatus, according to embodiments of the present disclosure.
Figure 9B:
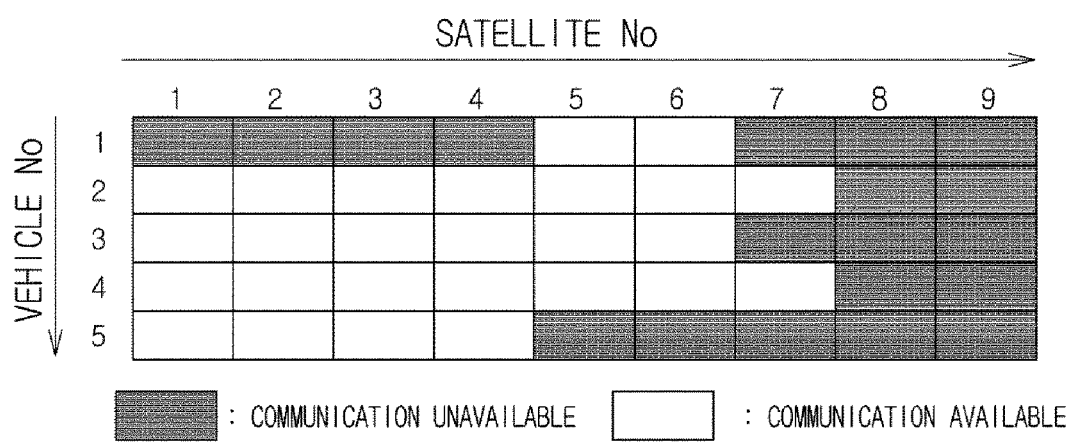

As shown in FIGS. 9A and 9B, the location awareness apparatus periodically checks information of satellites available to communicate with the vehicle 1, and also periodically checks and stores satellite information of other vehicles in the shared area Dsat.

If the number of satellites available for communication decreases to less than a reference number as the vehicle 1 moves into a shadow area, the location awareness apparatus determines one or more of other vehicles that uses the satellites shared with the vehicle 1 in location awareness, and sends a request to provide information to the determined other vehicle(s).

The reference number of satellites may be adjusted with the number of satellites from which signals may be received in each region.

If the number of satellites available for communication is reduced from satellites 1, 2, 3, 4, 5, and 6 to satellites 5 and 6 as the vehicle 1 moves into a shadow area, the location awareness apparatus determines that the number of satellites available for communication is less than a reference number, and sends a request to provide information to other vehicles 2, 3, 4, and 5 present in the shared area.

The other vehicles 2, 3, 4, and 5 may send satellite information, location information, and driving information to the vehicle 1.

Furthermore, the location awareness apparatus may determine satellite information of the other vehicles 2, 3, 4, and 5 and send a request to provide information only to those 2, 3, and 4 having information of all the satellites 1, 2, 3, 4, 5, and 6. Even in this case, the other vehicles 2, 3, and 4 may send satellite information, location information, and driving information to the vehicle 1.

Once the information is received from the other vehicle, the location awareness apparatus determines an initial difference between the current location of the vehicle 1 and the current location of the other vehicle, determines an amount of change in location of the other vehicle per unit time based on speed and direction information of the other vehicle, and makes second correction on the current location by reflecting the initial difference in location and the amount of change in location per unit time on a first corrected location corrected based on the satellite information.

Once the information is received from a plurality of other vehicles, the location awareness apparatus uses respective satellite information of the plurality of other vehicles to obtain first corrected values of the current location, obtains second corrected values based on respective speed and direction information of the plurality of other vehicles and makes first correction by reflecting a mean value of the first corrected values on the current location, and makes second correction on the location by reflecting a mean value of the second corrected values on the first corrected location.

Obtaining the second corrected value of the current location from the information of the other vehicle includes determining an initial difference between the current location of the vehicle 1 and the current location of the other vehicle, determining an amount of change in speed and direction of the other vehicle per unit time, and obtaining the second corrected value based on the initial difference in location and the amount of change in location per unit time, or obtaining a mean value of the second corrected values if there are a plurality of other vehicles. In this way, the respective second corrected values may be obtained from the information of the plurality of other vehicles.

Furthermore, after the location awareness apparatus determines satellite information of the other vehicles 2, 3, 4, and 5 and transmits a request to provide information to satellites 2, 3, and 4 having information of all the satellites 1, 2, 3, 4, 5, and 6, if the other vehicles 2, 3, and 4 all refuse to provide the information, the location awareness apparatus may transmit the request to the other vehicle 5 and correct the current location using information of satellites 1, 2, 3, and 4 received from the other vehicle 5.

Figure 9C:
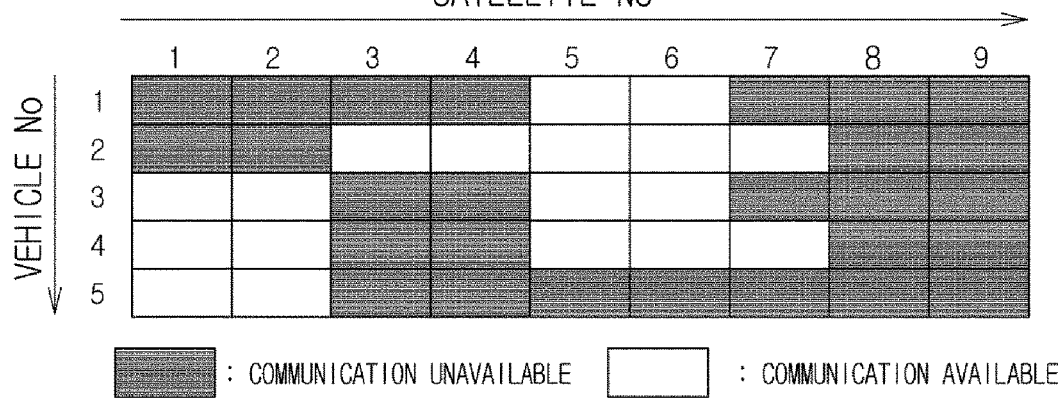

As shown in FIG. 9C, given that in the shared area, the other vehicle 2 has information of satellites 3, 4, 5, 6, and 7; the other vehicle 3 has information of satellites 1, 2, 5, and 6; the other vehicle 4 has information of satellites 1, 2, 5, 6, and 7; the other vehicle 5 has information of satellites 1 and 2, after transmitting a request to provide information to the other vehicles 2, 3, and 4, the location awareness apparatus may obtain information of satellites 3 and 4 from the other vehicle 2 and information of satellites 1 and 2 from the other vehicles 3 and 4.

In this case, since the other vehicle 5 receives signals from two satellites, location awareness of the other vehicle 5 may be considered impossible.

Accordingly, the location awareness apparatus does not use information of the other vehicle 5.

FIG. 10 is an additional flowchart of controlling a location awareness apparatus, according to embodiments of the present disclosure, which describes a sequence of location awareness arranged in a vehicle.

The vehicle 1 activates operation of the location awareness apparatus once a function based on location awareness is selected.

The location awareness apparatus activates operation of the GPS receiver 150 and antenna device 140 once receiving a command to activate operation. The location awareness apparatus receives signals of a plurality of satellites through the GPS receiver 150 in operation 311, and obtains information about time at which the respective satellites transmit the signals.

The location awareness apparatus may also determine and store identification information of the satellites from which the signals are received, in operation 312.

The location awareness apparatus obtains distances between the vehicle 1 and the respective satellites by comparing the information about time at which the signal is transmitted from each satellite and information about time at which the signal is received by the GPS receiver 150, and recognize the current location of the vehicle 1 based on the obtained distances, in operation 313.

The location awareness apparatus may enable the vehicle 1 to perform a location awareness based function by recognizing the location of the vehicle 1 while the vehicle 1 is driven and sending the recognized location to the microcomputer 170.

The location awareness apparatus establishes a shared area based on a radius stored in advance while recognizing the current location of the vehicle 1, in operation 314. Techniques for establishing the shared area are described above, so it will not described herein again. Furthermore, the operation of establishing the shared area may be omitted in some other embodiments.

The location awareness apparatus determines whether there is a satellite unavailable for communication during recognition of the current location of the vehicle 1 in operation 315, and if it is determined that there is a satellite unavailable for communication, transmits a request to provide information (i.e., a request for information) to other device located in the shared area in operation 316.

If a plurality of other vehicles are located in the shared area, the location awareness apparatus may send the request to provide information to the plurality of other vehicles or may selectively send the request to at least one of the plurality of other vehicles.

The location awareness apparatus receives satellite information, location information, and driving information provided by the other vehicle, in operation 317, and uses the information received from the other vehicle to correct the current location, in operation 318, and sends the corrected current location information to the microcomputer 170.

For example, if satellites 1, 2, and 3 are available to communicate with the vehicle 1, satellite 4 is not available to communication with the vehicle 1, and satellites 1, 2, 3, and 4 are all available to communicate with other vehicle, the land awareness apparatus may determine a distance between the two vehicles based on location information of the vehicle 1 and location information of the other vehicle, and expect information of the satellite 4 that is unavailable for communication, using the principle of ratio of the determined distance between the two vehicles and the area of a triangle formed by the respective vehicles and the satellite.

As such, if a satellite for location awareness is unavailable for communication, the location awareness apparatus may receive information of the satellite unavailable for communication from other vehicle to correct the current location.

Furthermore, the location awareness apparatus may determine respective changes over time in information of the plurality of satellites used in location awareness of other vehicle, and obtain an amount of change in location of the other vehicle based on the changes over time in the satellite information to correct the current location of the vehicle 1. The amount of change in location may be an amount of change in speed and direction of the other vehicle.

According to embodiments of the present disclosure, if communication with at least one satellite is impossible, information of the satellite with which communication is not possible may be obtained from satellite information provided by other vehicle(s) within a shared area, thereby securing the number of satellites required for location awareness, which leads to accurate awareness of the current location at low cost without need of additional devices. Accordingly, it may increase reliability of location information of a vehicle and communication between vehicles.

Furthermore, embodiments of the present disclosure may enable a vehicle to be accurately aware of its current location by correcting the current location with location information provided from an infrastructure, even when there is no other nearby vehicle. With the embodiments of the present disclosure, performance and accuracy of functions of various location-based applications, such as a navigation function or autonomous driving function that guides routes based on location information of the vehicle may be improved.

As such, the embodiments of the present disclosure may improve the quality and commercial value of a vehicle that has an autonomous driving function, navigation function, and ability to communicate with other vehicles, and further increase user satisfaction and safety of the vehicle, thereby securing competitiveness of the vehicle.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A location awareness apparatus equipped in a device, the location awareness apparatus comprising:
    a communication unit performing communications with a plurality of satellites and with another device; and
    a controller configured to recognize a current location of the device based on information received from the plurality of satellites, control communications with the other device when a number of satellites available for communication is less than a reference number during the recognition of the current location, receive satellite information from the other device, correct the current location based on the information received from the plurality of satellites and the satellite information received from the other device, receive location information and driving information of the other device, and further correct the current location based on the received location information and driving information of the other device,
    wherein the driving information includes speed information and direction information.

2. The location awareness apparatus of claim 1, wherein the controller establishes a shared area based on the current location and transmits a request for information to the other device when the other device is present in the shared area.

3. The location awareness apparatus of claim 1, wherein the controller obtains comparison information between common satellites by comparing the information received from the plurality of satellites to the satellite information received from the other device, determines satellite information among the satellite information received from the other device which matches information of a satellite unavailable for communication with the device, and obtains information of the satellite unavailable for communication for location awareness of the device based on the determined satellite information and the obtained comparison information.

4. The location awareness apparatus of claim 1, wherein the controller, when receiving satellite information from a plurality of other devices, calculates corrected values of the current location based on the satellite information received from the plurality of other devices and corrects the current location by averaging the calculated corrected values.

5. A location awareness apparatus equipped in a device, the location awareness apparatus comprising:
    a communication unit performing communications with a plurality of satellites and another device; and
    a controller recognizing a current location of the device based on information received from the plurality of satellites, receiving information of at least one satellite unavailable for communication from the other device when the other device is present in a shared area and communication with the satellite is unavailable during the recognition of the current location, and correcting the current location based on the received information of the satellite unavailable for communication,
    wherein the received information of the satellite unavailable for communication includes information about time spent attempting to receive a signal from the satellite unavailable for communication with the device and information about a distance between the satellite and the other device.

6. The location awareness apparatus of claim 5, wherein the controller, when receiving satellite information from a plurality of other devices:
    obtains information of the satellite unavailable for communication based on the respective satellite information received from the plurality of other devices,
    calculates corrected values of the current location based on the obtained information of the satellite unavailable for communication, and
    corrects the current location by averaging the calculated corrected values.

7. The location awareness apparatus of claim 5, wherein the controller receives location information of the other device and further corrects the current location based on a difference between the current location information and the location information of the other device.

8. A vehicle comprising:
a receiver receiving signals from a plurality of satellites;
an antenna device communicating with another vehicle; and
a location awareness apparatus analyzing the signals received from the plurality of satellites to obtain information of the plurality of satellites, recognizing a current location of the location awareness apparatus based on the obtained information of the plurality of satellites, using the antenna device to control communications with the other vehicle when a number of satellites available for communication is less than a reference number during the recognition of the current location, receiving satellite information from the other vehicle, and correcting the current location based on the obtained information of the plurality of satellites and the satellite information received from the other vehicle,
wherein the location awareness apparatus receives location information and driving information of the other vehicle and further corrects the current location based on the received location information and driving information of the other vehicle.

9. The vehicle of claim 8, wherein the location awareness apparatus obtains comparison information between common satellites by comparing the information of the plurality of satellites and the satellite information received from the other vehicle, determines satellite information among the satellite information received from the other vehicle which matches information of a satellite from which the receiver is unable to receive a signal, and obtains information of the satellite from which the receiver is unable to receive a signal based on the determined satellite information and the obtained comparison information.

10. The vehicle of claim 8, wherein the location awareness apparatus establishes a shared area based on the current location and transmits a request for information to the other vehicle when the other vehicle is present in the shared area.

11. The vehicle of claim 10, wherein the location awareness transmits a request for information to the other vehicle in a communication available area larger than the shared area when no other vehicle is present in the shared area.

12. The vehicle of claim 8, wherein the location awareness apparatus, when receiving satellite information from a plurality of other vehicles, calculates corrected values of the current location based on the satellite information received from the plurality of other vehicles and corrects the current location by averaging the calculated corrected values.

13. The vehicle of claim 12, wherein the location awareness apparatus, when receiving the location information and driving information from the plurality of other vehicles, calculates corrected values of the corrected current location based on the location information and driving information received from the plurality of other vehicles and further corrects the current location by averaging the calculated corrected values.

14. The vehicle of claim 8, further comprising:
a detector detecting a speed and direction of the vehicle,
wherein the location recognition apparatus obtains a difference in location from the other vehicle and an amount of change in location based on the speed information and direction information detected by the detector and further corrects the current location based on the obtained difference in location and amount of change in location.

15. The vehicle of claim 14, further comprising:
a microcomputer controlling transmission of the speed, the direction, the information received from the plurality of satellites, and the current location recognized by the location awareness apparatus when a request to provide information is received from the other vehicle.

16. The vehicle of claim 8, wherein the location awareness apparatus determines another vehicle in communication with a number of the plurality of satellites that is greater than a reference number, establishes a shared area based on a distance from the vehicle to the determined other vehicle, and transmits a request for information to the other vehicle when the other vehicle is present in the shared area.

17. The vehicle of claim 8, wherein the antenna device further communicates with an infrastructure, and the location awareness apparatus corrects the current location based on information obtained from the communications with the infrastructure.

18. A method for controlling a location awareness apparatus equipped in a vehicle, the method comprising:
analyzing signals from a plurality of satellites received by a receiver to obtain information of the plurality of satellites;
recognizing a current location of the location awareness apparatus based on the obtained information of the plurality of satellites;
establishing a shared area based on the current location;
using an antenna device to transmit a request for information to another vehicle present in the shared area when a number of satellites available for communication during the recognition of the current location is less than a reference number;
receiving satellite information from the other vehicle; and
correcting the current location based on the obtained information of the plurality of satellites and the satellite information received from the other vehicle,
wherein the location awareness apparatus transmits the request for information to the other vehicle in a communication available area larger than the shared area when no other vehicle is present in the shared area.

19. The method of claim 18, further comprising:
receiving location information and driving information from the other vehicle; and
further correcting the current location based on the location information and driving information received from the other vehicle.

20. The method of claim 19, wherein the further correcting of the current location comprises:
obtaining an initial difference in location by comparing the recognized current location information to the location information received from the other vehicle;
obtaining an amount of change in location of the other vehicle per unit time based on speed information and direction information received from the other vehicle; and
correcting the current location based on information about the corrected current location, the initial difference in location, and the amount of change in location per unit time.

21. The method of claim 19, wherein the further correcting of the current location comprises:
calculating corrected values of the current location based on satellite information received from a plurality of other devices, and
correcting the current location by averaging the calculated corrected values.

22. The method of claim 21, further comprising:
when location information and driving information is received from a plurality of other vehicles, calculating corrected values of the current location based on the location information and driving information received from the plurality of other vehicles; and
further correcting the current location by averaging the calculated corrected values.

* * * * *